Feb. 12, 1952   W. McCOLLUM, JR., ET AL   2,585,397
AUTOMOBILE FENDER FLAP CLAMP
Filed Sept. 23, 1949   3 Sheets-Sheet 1
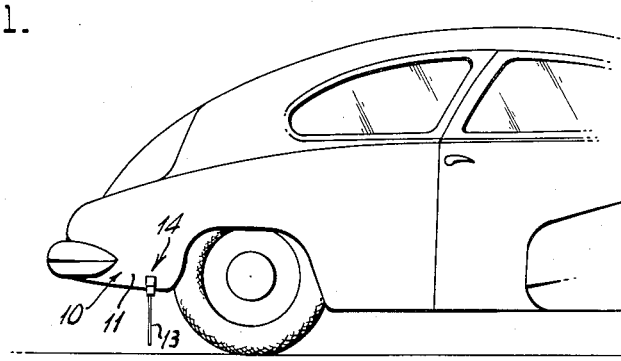
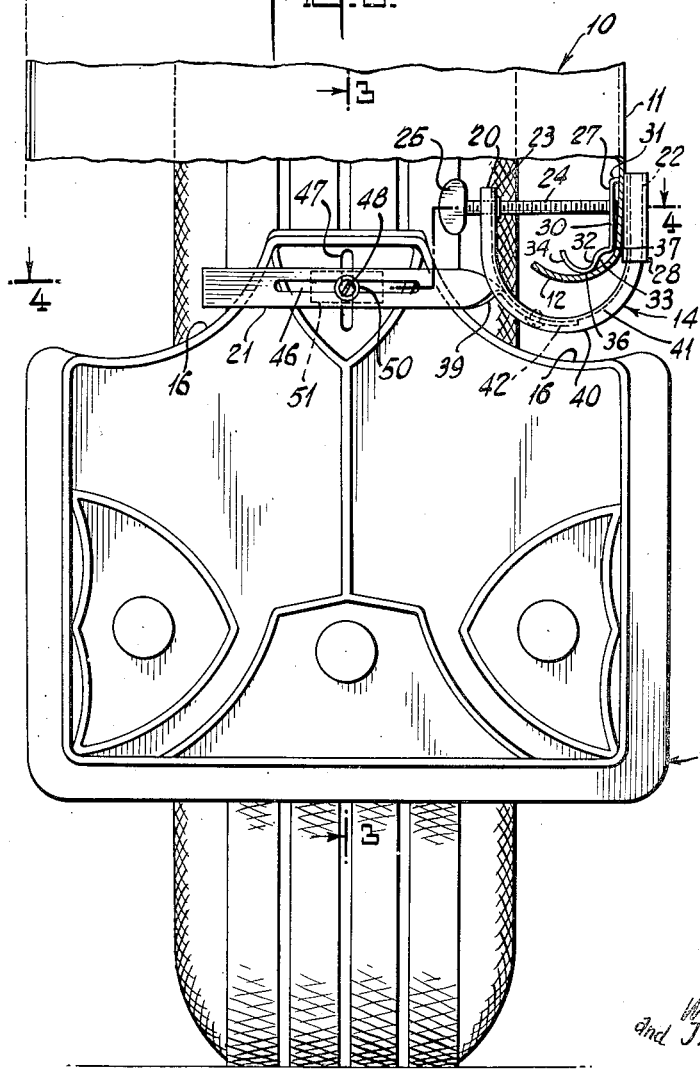
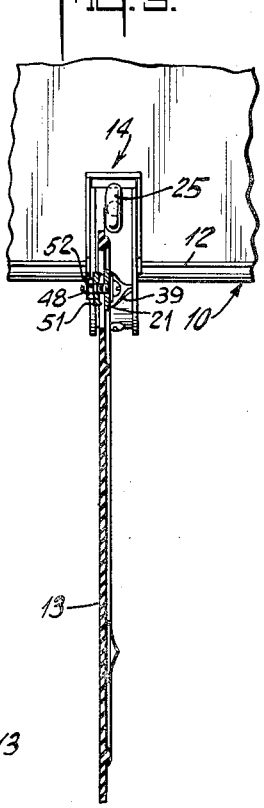
INVENTOR
WILLIAM McCOLLUM JR.
and JAMES M. WALLACE
BY
ATTORNEYS Feb. 12, 1952     W. McCOLLUM, JR., ET AL     2,585,397
AUTOMOBILE FENDER FLAP CLAMP
Filed Sept. 23, 1949     3 Sheets-Sheet 2
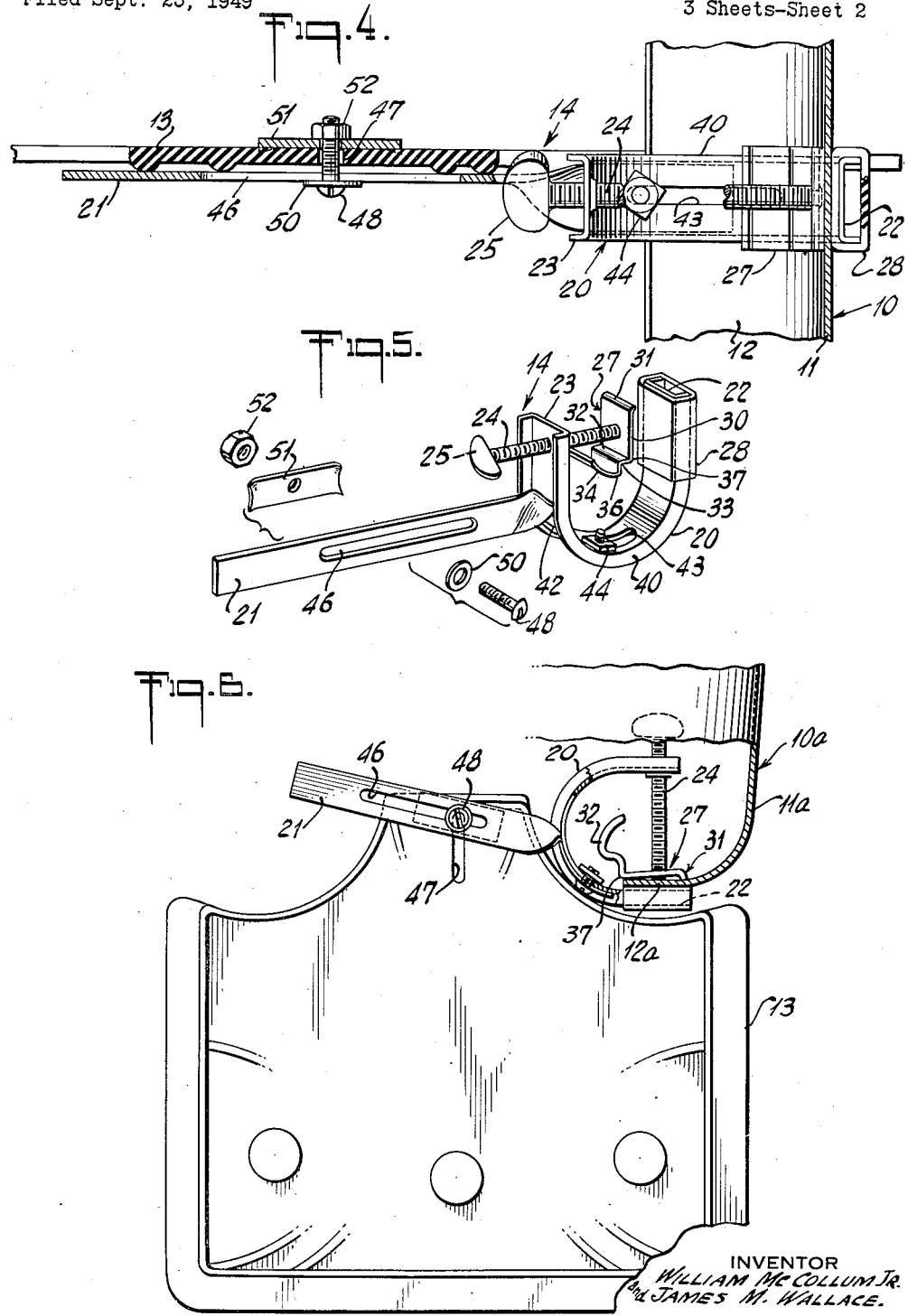
INVENTOR
WILLIAM McCOLLUM JR.
and JAMES M. WALLACE.
BY
ATTORNEYS Feb. 12, 1952　　W. McCOLLUM, JR., ET AL　　2,585,397
AUTOMOBILE FENDER FLAP CLAMP
Filed Sept. 23, 1949　　　　　　　　　　3 Sheets-Sheet 3
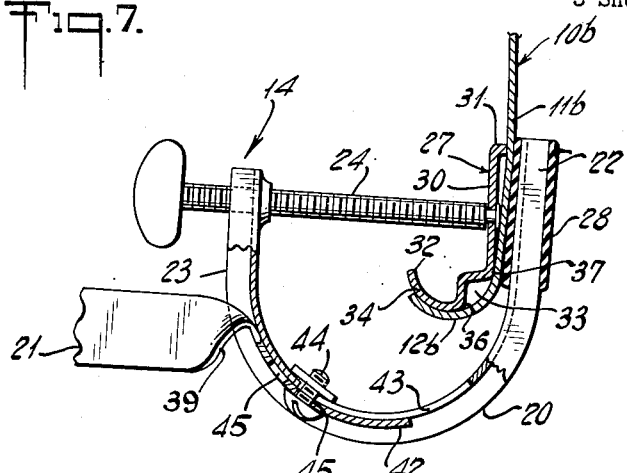
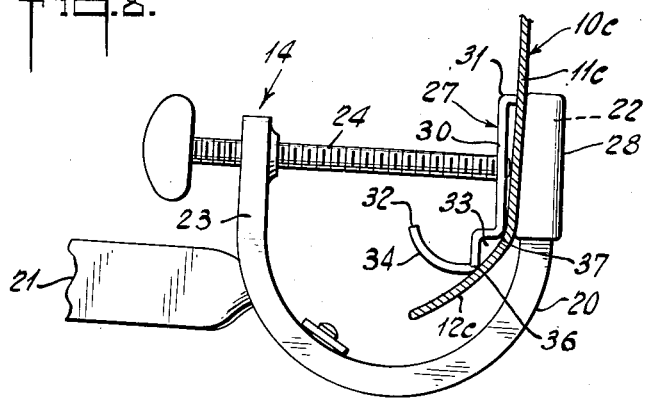
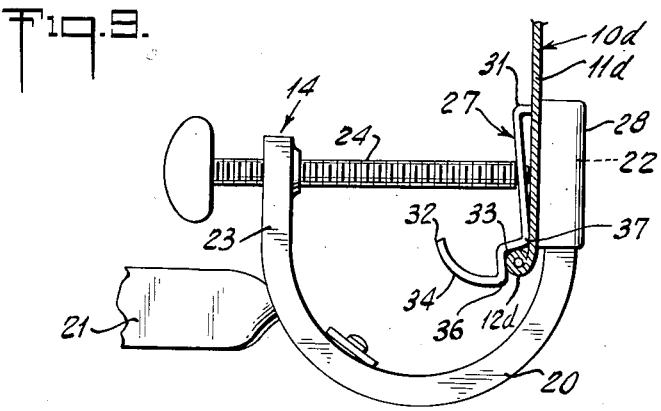
INVENTOR
WILLIAM McCOLLUM JR.
and JAMES M. WALLACE.
BY
ATTORNEYS Patented Feb. 12, 1952

2,585,397

UNITED STATES PATENT OFFICE 2,585,397

AUTOMOBILE FENDER FLAP CLAMP

William McCollum, Jr., Westfield, and James Moore Wallace, Rahway, N. J., assignors to Tingley Reliance Rubber Corporation, a corporation of New Jersey Application September 23, 1949, Serial No. 117,332

13 Claims. (Cl. 280—154.5)

The present invention relates to automobile fender flaps and to supporting clamps therefor and, more particularly, to that type of fender flap and supporting clamp adapted to be attached to the fender of an automobile to protect the sides of the fender and the back or front of the car from mud, gravel, tar and oil.

At the present time, the design of rear fenders follows one general pattern as far as their rear ends are concerned, and the design of front fenders follows a similar pattern as far as their front ends are concerned. Fenders all have a generally downwardly extending side wall section and an inwardly turned flange or rib at its lower edge. However, fenders do differ in the specific design of said inturned flanges in accordance with three or four general patterns. For example, in some specific designs, the flange is in the form of a narrow rim or in the form of a bead, while in others it may be wide and have different degrees of general inclination and different degrees of curvature.

Since fender flap supporting clamps are usually attached to the side and lower flange sections of the fender, it is advisable to make these clamps of universal construction to adapt them for attachment to a fender of any one of the several different standard designs. Also, it is important that the fender flap be adjustable to hang down squarely and in proper elevation with respect to the ground, and to be properly located horizontally with respect to the wheels, regardless of the shape of the fender to which it is attached.

One object of the present invention is to provide a new and improved supporting clamp for an automobile fender flap, which is comparatively simple and inexpensive to manufacture, which can be conformably applied to a fender of any one of a number of standard designs with the simplest of manipulation, which can be easily adjusted to bring the flap supported therefrom into proper selective angularity, elevation and location with respect to the ground and the wheels, and which lends itself to infinite adjustments in the angularity, elevation and horizontal location of the flap supported therefrom.

Another object is to provide a new and improved fender flap designed to cooperate with the improved clamp of the present invention.

Various other objects will be apparent from the following description and from the accompanying drawings, in which:

Fig. 1 is a side elevation of a rear portion of an automobile, showing the improved clamp and flap attached to a rear fender thereof;

Fig. 2 is an enlarged vertical view through a portion of an automobile fender, just rearwardly of the right rear wheel, showing the improved clamp attached thereto and a fender flap supported thereby;

Fig. 3 is a vertical section taken on lines 3—3 of Fig. 2;

Fig. 4 is a horizontal section taken on lines 4—4 of Fig. 2;

Fig. 5 is an exploded view in perspective of the improved clamp;

Fig. 6 is a vertical section similar to Fig. 2, but illustrating a fender of a different type and one requiring adjustment of the clamp and fender flap to hang down said flap squarely; and Figs. 7, 8 and 9 are side elevational views of the clamp showing its attachment to automobile fenders of different designs.

Referring to Fig. 1 of the drawings, there is shown a conventional automobile having a rear fender 10, the rear section of the fender beyond the corresponding right rear wheel having an upstanding side wall section 11 and an inturned flange 12 along its lower edge. The clamp of the present invention is shown applied to this rear fender on one side of the automobile, but it must be understood that it may also be applied to the front fender and that a similar clamp is employed for the fender or fenders on the other side of the automobile.

A fender flap 13 is adapted to be suspended from the fender 10 through a clamp 14, attachable to the side wall section 11 and to the inturned flange 12 of this fender, in a manner to be described. The flap 13 is desirably of generally rectangular form and made of suitable resilient material, such as rubber, and has its two upper corners provided with arcuate recesses 16 to clear the lower edges of the fender 10 and to permit said flap to be located in proper position with respect to the tires, as shown in Fig. 2. Two similar recesses 16 are provided in each flap 13 in order to permit one flap to be used interchangeably for either the left or right side of the car.

The clamp 14 of the present invention comprises a U-frame 20, to which is adjustably secured a flap supporting arm 21. One leg 22 of this clamp frame 20 serves as a fixed jaw to bear against the finished outside face of the fender in attached position of the clamp, and the other leg 23 serves as an abutment into which is threaded a screw 24 terminating at its outer end in a thumb piece 25 and pivotally carrying at its inner end a jaw piece 27 adapted to bear against the unfinished inside face of the fender in opposition to said leg or jaw 22. The pivotal connection between the screw 24 and the jaw piece 27 is such as to permit said jaw piece to rotate about said screw and affords enough lost motion to permit limited rocking of said jaw piece with respect to a plane at right angles to the axis of said screw, for the purpose later to appear. The fixed leg or jaw 22 is desirably covered with some cushioning material to protect the finished face of the fender contacted thereby from being scratched or marred. To that end, a sleeve 28 of resilient or yieldable material, such as rubber, is fitted snugly or tightly over said jaw.

The movable jaw piece 27 is shaped to adapt itself conformably to fenders of different designs, and for that purpose, it is in the form of a rectangular plate bent to define a main clamping body 30, a narrow gripping flange 31 at one end turned in one direction, and a lateral clamping foot extension 32 at the other end turned generally in the opposite direction. This clamping foot extension 32 has an inward offset or depression 33 forming a substantially rectangular recess for receiving the bead edge of a fender in certain types of fender, as will hereinafter be more fully described. The depression 33 defines an outer curved clamping section 34, a bend or projection 36 between the clamping section 34 and the depression 33, and a bend or heel 37 between the depression 33 and the clamping body 30.

For adjustably securing the arm 21 to the U-frame 20, said frame has its base section 40 of circular curvature and is externally of channel formation with confining side flanges 41 to form a guideway. The arm 21 is made of flat stock and has a quarter twist 39 near one end defining an offset extension 42 arcuately curved facewise, as distinguished from edgewise, and having a radius corresponding to that of the outer base section 40 of the U-frame to seat conformably thereagainst in the channel of the frame between the flanges 41 thereof and to ride easily therealong during adjustments. The flanges 41 also add stiffness and rigidity to the U-frame and prevent any fore-and-aft rocking of the arm 21 with respect to the U-frame 20 in any adjusted position.

For adjustably securing the arm extension 42 to the frame 20, said frame has a long slot 43 along its base section 40 and carries a fastening bolt 44 passing through a circular hole 45 (Fig. 7) in said arm extension and through said slot. In lieu of a single continuous slot, several slots of shorter length might be employed or even a series of individual holes to accommodate the bolt 44. The arm extension 42 may have any desired number of such bolt receiving holes 45 (two being shown), according to the extreme angular relationship required between the arm 21 and the clamp frame 20.

For adjustably securing the flap 13 to the arm 21, said arm has an elongated slot 46 extending lengthwise thereof, and said flap has at its upper end a vertical elongated slot 47 extending crosswise of said arm slot. A holding bolt screw 48 passes through a washer 50, through the slots 46 and 47, and through a clamping plate 51 having its four corners turned slightly inwardly or pointed for embedment in the rear surface of the flap and is threaded into a nut 52 bearing against the outer face of said clamping plate. In this way, the flap can be hung in any required position regardless of the adjusted position of the U-frame or the supporting arm 21.

Figs. 1 to 4 show one manner in which the clamp 14 and flap 13 can be attached to and supported from one standard type of fender. In this type, the side wall section 11 of the fender is vertical and the inturned flange 12 is of substantial width and of substantial curvature but can still be accommodated in the clamp frame 20. For this type of fender, the flap supporting arm 21 is mounted horizontally, the U-frame 20 is set in upright position to receive the lower edge portion of the fender, and the thumb screw 24 is turned until the side wall fender section 11 is firmly clamped between the fixed jaw or leg 22 and the movable jaw 27. In this clamped position, the fixed rubber-covered jaw 22 will engage the outer surface of the vertical side wall section 11 and the movable jaw 27 will be so inclined that its flange 31 and heel 37 will engage the inner surface of said side wall fender section, while the bend or projection 36 of said movable jaw will strongly press against the inner surface of the fender flange 12, thereby insuring firm anchorage of the clamp 14 to the fender. The lost motion connection between the screw 24 and the movable jaw 27 (by which said jaw is permitted to tilt with respect to a plane at right angles to the axis of said screw) permits the jaw to assume automatically the clamping position described when the screw is tightened.

With the clamp 14 so mounted, and the supporting arm 21 extending horizontally, the flap 13, through simple loosening and tightening of the screw 48, can be adjusted to any position, horizontally or vertically, within the limits of its adjusting range.

Fig. 6 shows the adaptation of the clamp 14 to a fender 10a, in which the side wall section 11a is not necessarily vertical and in which the inturned flange 12a along its lower edge is so wide that it cannot fit comfortably within the clamp frame 20 when in upright position. In this type of fender, the flange 12a extends almost horizontally and hence the clamp frame 20 is positioned on its side, rather than upright, to locate the jaws 22 and 27 on opposite sides of the flange. In this instance, the movable jaw 27 will have its gripping flange 31 and its bend or heel 37 firmly pressed against the inner surface of the fender edge flange, and the arm 21 will extend upwardly from the horizontal at a slight inclination. By taking advantage of the arm slot 46 and flap slot 47, plus the pivotal mounting afforded by the screw 48, the flap 13 can still be adjusted into proper position with respect to the ground and the wheel.

Fig. 7 shows the adaptation of the clamp 14 to a fender 10b, in which the side wall section 11b is substantially vertical and in which the inturned flange 12b along its lower edge is comparatively narrow and has a curvature corresponding to the curvature of the outer clamping section 34 of the movable jaw 27. For this type of fender, the U-frame 20 is set in upright position with the lower section of the fender extending into said frame, and with the side wall section 11ᵇ located between the clamp jaws 22 and 27. In this instance, the movable jaw 27 will have its gripping flange 31 and its bend or heel 37 firmly pressed against the inner surface of the side wall section 11ᵇ, while the outer curved clamping section 34 of the jaw 27 will be firmly and conformably seated against the inturned flange 12ᵇ of the fender.

Fig. 8 shows the adaptation of the clamp 14 to a fender 10ᶜ, in which the side wall section 11ᶜ is substantially vertical and in which the inturned flange 12ᶜ along its lower edge is comparatively wide but is still narrow enough to extend into the U-frame 20 when in upright position, even though it has a wide curvature and extends generally obliquely downwardly from the lower edge of said side wall section. For this type of fender construction, the U-frame 20 is located in upright position, with the lower section of the fender extending into said frame and with the side wall section 11ᶜ located between the clamp jaws 22 and 27. In this instance, the movable jaw 27 will have its gripping flange 31 and its bend or heel 37 firmly pressed against the inner surface of the side wall section 11ᶜ, while the bend or projection 36 of said jaw will be firmly pressed against the inner surface of the inturned flange 12ᶜ of the fender.

Fig. 9 shows the adaptation of the clamp 14 to a fender 10ᵈ, in which the side wall section 11ᵈ is substantially vertical and in which the inturned flange 12ᵈ along its lower edge is in the form of a rolled bead. In this case, the U-frame 20 is set in upright position with the lower section of the fender extending into said frame and the side wall section 11ᵈ located between the clamp jaws 22 and 27. In this instance, the movable jaw 27 will have its gripping flange 31 and its bend or heel 37 firmly pressed against the inner surface of the side wall fender section 11ᵈ, while the bead 12ᵈ of the fender will extend snugly and firmly into the recess 33 of the jaw foot 32.

It should be noted, in all cases, that the connection between the arm 21 and the U-frame 20 is such as to leave the space between the legs 22 and 23 of said frame free and clear except for the screw 24 and movable jaw 27. This permits free and easy entry of the lower section of the fender into said space during mounting operations.

In some of the fender designs, even assuming that the heel 37 on the movable jaw 27 does not press the side wall section of the fender firmly against the fixed jaw 22, the gripping flange 31 on said movable jaw will, in each case, except where the clamp frame 20 is turned horizontally (Fig. 6), be pressing said fender wall section firmly against the fixed jaw, and some part of the foot section 32 of the movable jaw will be pressing firmly against the inturned fender flange. The movable jaw 27 will, therefore, in every case, have two spaced regional contacts with the fender and this will serve to assure firm anchorage of the clamp 14 to the fender. The pressing action of some part of the foot section 32 of the movable jaw 27 against the fender flange has a force component pressing the side wall section of the fender in surface contact with the covered fixed jaw 22, thereby adding to the firm anchorage of the clamp 14 to the fender.

While the invention has been shown and described with particular reference to a specific embodiment, it is to be understood that it is not to be limited thereto, but it is to be construed broadly and restricted solely by the scope of the appended claims.

What is claimed is:

1. A clamp for attachment to a fender, including a U-shaped frame having a section curved therealong, one of the legs of said frame defining a fixed clamping jaw, a movable clamping jaw supported on said frame for movement with respect to and clamping cooperation with said fixed jaw, an arm for supporting a fender flap having a section at one end engaging said curved frame section and adjustable therealong to vary the angularity of said arm with respect to said frame, and a releasable connection between said arm section and said curved frame section for locking said arm and said frame in relatively adjusted position.

2. A clamp for attachment to a fender, including an approximately U-shaped frame, one of the legs of said frame defining a fixed clamping jaw, a movable clamping jaw supported on said frame for movement with respect to and clamping cooperation with said fixed jaw, said frame also including a leg part opposite to said jaw leg and a base part between said leg part and said jaw leg, one of said frame parts having a section curved therealong, an arm for supporting a fender flap having a section at one end curved to correspond to the curvature of said curved frame section and seated conformably thereagainst, said arm section being adjustable along said curved frame section to vary the angularity of said arm with respect to said frame, and a releasable connection between said arm section and said curved frame section for locking said arm and said frame in relatively adjusted position.

3. A flap clamp for attachment to a fender, including a U-shaped frame having a circular base section, one of the legs of said frame defining a fixed clamping jaw, a movable clamping jaw supported on said frame for movement with respect to and clamping cooperation with said fixed jaw, an arm for supporting a fender flap having a circular section at one end corresponding in radius to that of said frame base section and seated conformably thereagainst, said arm section being adjustable along said base section to vary the angularity of said arm with respect to said frame, and a releasable connection between said arm section and said base section for locking said arm and said frame in relatively adjusted position.

4. A flap clamp for attachment to a fender, including a U-shaped frame defining a curved channel extending along its outer periphery, and having one leg adapted to serve as a fixed clamping jaw, a movable clamping jaw supported on said frame for movement with respect to and clamping cooperation with said jaw, an arm for supporting a fender flap having a section at one end extending into said channel and guidably adjustable therealong to vary the angularity of said arm with respect to said frame, and a releasable connection between said arm section and said frame for locking said arm and said frame in relatively adjusted position.

5. A flap clamp for attachment to a fender, including a U-shaped frame having a circular base section and made of channel stock to define a guideway along its outer periphery, said frame having one leg adapted to serve as a fixed clamping jaw, a movable clamping jaw supported on said frame for movement with respect to and clamping cooperation with said fixed jaw, an arm for supporting a fender flap having a circular section at one end corresponding in radius to that of said frame base section and seated conformably in said guideway against said frame base section, said arm section being adjustable along said base section to vary the angularity of said arm with respect to said frame, and an elongated slot and screw connection between said arm section and said frame for locking said arm and said frame in relatively adjusted position.

6. A flap clamp for attachment to a fender, including a U-shaped frame having a curved base section, one leg of said frame defining a fixed clamping jaw, a movable clamping jaw supported on said frame for movement with respect to and clamping cooperation with said fixed jaw, a flat bar having a quarter twist near one end and having its end section beyond the twist offset from the main body of said bar and curved facewise to correspond to the curvature of said curved base section, the bar offset end section being seated conformably against said curved base section and being adjustable therealong to vary the angularity of said bar with respect to said frame, and a releasable connection between said bar offset end section and said frame base section for locking said bar and said frame in relatively adjusted position.

7. A clamp adapted to be attached to the lower edge portion of an automobile fender, comprising a U-frame, one leg of which defines a fixed clamping jaw, a screw threaded into the other leg and extending transversely thereof towards the leg defining said fixed jaw, and a clamping jaw piece in the form of a plate bent to provide a plurality of clamping conformations to accommodate fenders of different standard designs, and supported at one end of said screw between said legs for movement towards and away from the leg defining said fixed jaw upon rotation of said screw, said clamping jaw piece having a lost-motion connection with said screw end to permit said clamping jaw piece to tilt to a limited extent with respect to a plane at right angles to the screw axis.

8. A clamp adapted to be attached to the lower edge portion of an automobile fender of the type having a side upstanding wall section and an inturned flange along the lower edge of said wall section, comprising a U-frame, one leg of which defines a fixed clamping jaw, a screw threaded into the other leg and extending transversely thereof towards the leg defining said fixed jaw, and a clamping jaw piece supported at one end of said screw between said legs and movable towards and away from said fixed jaw upon rotation of said screw, said jaw piece being in the form of a plate bent to provide a main clamping body adapted to engage the inner surface of the side wall section of the fender in mounted position of said clamp, and a foot at one end of said body extending generally in a direction away from said fixed jaw and having its outer end section curved for conforming seating engagement with the inner surface of said flange in mounted position of said clamp, where said flange is of the curved type to receive said outer end foot section, said clamping body having a lost-motion connection intermediate of its ends with the end of said screw between said frame legs, to support said body substantially at right angles to the axis of said screw but to permit said body to tilt to a limited extent with respect to a plane at right angles to said screw axis.

9. A clamp according to claim 8, wherein the foot has a depression to define a recess for receiving the inturned flange of the fender in mounted position of said clamp, where said flange is in the form of a bead.

10. A clamp according to claim 8, wherein the foot has a depression to define a recess for receiving the inturned flange of the fender in mounted position of said clamp, where said flange is in the form of a bead, and to define a projection or bend between said outer end section of the foot and said depression for engagement with the inner surface of the inturned flange of the fender, where said flange is of the wide curved type having a radius too large to conformably receive the outer end section of said foot.

11. A clamp according to claim 8, wherein the main clamping body has a gripping flange at its outer end extending towards said fixed jaw, said gripping flange and the heel of said clamping body at the base thereof being adapted to engage the inner surface of the side upstanding wall section of the fender in mounted position of said clamp.

12. A clamp adapted to be attached to the lower edge portion of an automobile fender having a side upstanding wall section and an inturned flange along the lower edge of said wall section, comprising a U-frame, one leg of which defines a fixed clamping jaw, a screw threaded into the other leg and extending transversely thereof, a clamping jaw piece carried at one end between said legs and movable towards and from said fixed jaw by the rotation of said screw, said frame having at its outer periphery a curved section extending from said other leg and along at least a substantial part of the base of said frame, an arm adapted to carry a fender flap at one end and having an offset at the other end engaging the outer periphery of said frame at said curved section and adjustable therealong to permit said U-frame to be set in upright position or in horizontal position, when said arm is substantially horizontal, said jaw being adapted to clamp the side upstanding wall section of one type of fender therebetween when said U-frame is set in upright position and being adapted to clamp the inturned flange of another type of fender therebetween when said U-frame is set horizontally.

13. A clamp adapted to be attached to the lower edge portion of an automobile fender of the type having a side upstanding wall section and an inturned flange along the lower edge of said wall section, comprising a U-frame, one leg of which defines a fixed clamping jaw, a screw threaded into the other leg and extending transversely thereof towards the leg defining said fixed jaw, and a clamping jaw piece supported at one end of said screw between said legs and movable towards and away from said fixed jaw upon rotation of said screw, said jaw piece being in the form of a plate bent to provide a main clamping body adapted to engage the inner surface of the side wall section of the fender in mounted position of said clamp, and a foot at one end of said body extending generally in a direction away from said fixed jaw, said main clamping body having a gripping flange at its other end extending towards said fixed jaw, said gripping flange and the heel of said foot being adapted to engage the inner surface of the side upstanding wall section of the fender in mounted position of said clamp, said clamping body having a lost-motion connection intermediate of its ends with the end of said screw between said frame legs to support said body substantially at right angles to the axis of said screw but to permit said clamping body to tilt to a limited extent with respect to a plane at right angles to said screw axis.

WILLIAM McCOLLUM, Jr.
JAMES MOORE WALLACE.

REFERENCES CITED

The following references are of record in the file of this patent:

UNITED STATES PATENTS

| Number | Name | Date |
|---|---|---|
| 1,132,147 | Arbeiter | Mar. 16, 1915 |
| 1,794,122 | Schaffer | Feb. 24, 1931 |
| 1,827,498 | Weeks | Oct. 13, 1931 |
| 2,084,087 | Jackson | June 15, 1937 |
| 2,235,421 | Devine | Mar. 18, 1941 |
| 2,452,116 | Felton | Oct. 26, 1948 |

FOREIGN PATENTS

| Number | Country | Date |
|---|---|---|
| 718,358 | France | Nov. 4, 1931 |